United States Patent [19]

Bennecke et al.

[11] 4,144,172

[45] Mar. 13, 1979

[54] INDUSTRIAL LIQUID CLEANSING APPARATUS

[76] Inventors: Earl J. Bennecke; Mark R. Bennecke, both of 8249 S. Lockwood, Burbank, Ill. 60459

[21] Appl. No.: 866,808

[22] Filed: Jan. 3, 1978

[51] Int. Cl.² .............................................. B01D 21/02
[52] U.S. Cl. .................... 210/525; 210/532 R
[58] Field of Search ................ 210/84, 513, 519, 525, 210/528, 532 A, 532 S–539

[56] References Cited

U.S. PATENT DOCUMENTS

| 2,120,786 | 6/1938 | Jordan | 210/513 X |
| 2,348,723 | 5/1944 | Boosey | 210/539 |

FOREIGN PATENT DOCUMENTS 67030 11/1944 Austria ..................................... 210/535

Primary Examiner—William A. Cuchlinski, Jr.
Attorney, Agent, or Firm—John R. Diver

[57] ABSTRACT

An apparatus for continuous cleansing of industrial liquids which maximizes the floatation and settling of waste out of dirty liquids having submerged introduction of the liquid into a large settling tank followed by upflow into the inlet of a standpipe in said tank, and accelerated upflow of the liquid into a separator pipe wholly within said standpipe followed by downflow from the top of said separator pipe to separate floatable wastes and discharge clean liquid outwardly at the top of said tank.

8 Claims, 1 Drawing Figure

INDUSTRIAL LIQUID CLEANSING APPARATUS

BACKGROUND OF THE INVENTION

Floatation and settling tanks have long been used for the separation of solid waste material from dirty industrial liquids for reactivation and reuse according to specific gravity of the waste in a gravity field. Centripetal acceleration has been used in place of gravity to achieve the separation process. Such high-speed rotative equipment is expensive. There is need for a low-cost, easily-maintainable, linear-acceleration separator device that assists gravity in the process of dirt separation and it is an object of the present invention to fulfill that need.

SUMMARY OF THE INVENTION

The gist of this invention lies in an apparatus which maximizes buoyant and settling forces on floatable and settleable waste suspended in liquids comprising a tank of large hydraulic diameter containing dirty liquid having both upward and downward submerged introduction of dirty liquid through an inflow separator tube of small hydraulic diameter opening adjacent to the inside wall of the tank. A standpipe of intermediate hydraulic diameter, which is in fluid communication with the interior of the tank at its midsection and lower portions, mounts on the bottom of said tank and extends to the top of the same above the level of the liquid therein.

A separator pipe of small hydraulic diameter depends from above the level of the liquid in the tank within said standpipe, and has its inlet opening in a downwardly direction adjacent to and spaced above the bottom of said tank. An outflow separator pipe of smaller hydraulic diameter has an upwardly-opening elbow in fluid communication with the second separator pipe. The elbow has its inlet below the level of the liquid in the tank and extends outwardly from the tank for the discharge of cleaned liquid from the separator.

A rotatable skimmer is located adjacent the top of the tank for the skimming of floatable waste from the top surface of the dirty liquid for removal therefrom, and a concaved tank bottom with a sludge drain centrally-located therein assists in gravity removal of the settled material from the bottom of the tank. A wash means also extends across the internal portion of the tank spaced above the bottom for flushing the bottom of the tank with clean liquid.

DESCRIPTION OF THE DRAWING

A specific embodiment of this invention is illustrated by the accompanying drawing which shows a vertical cross-section of the solid waste separator apparatus of this invention.

DESCRIPTION OF THE PREFERRED EMBODIMENT

Figure 1:
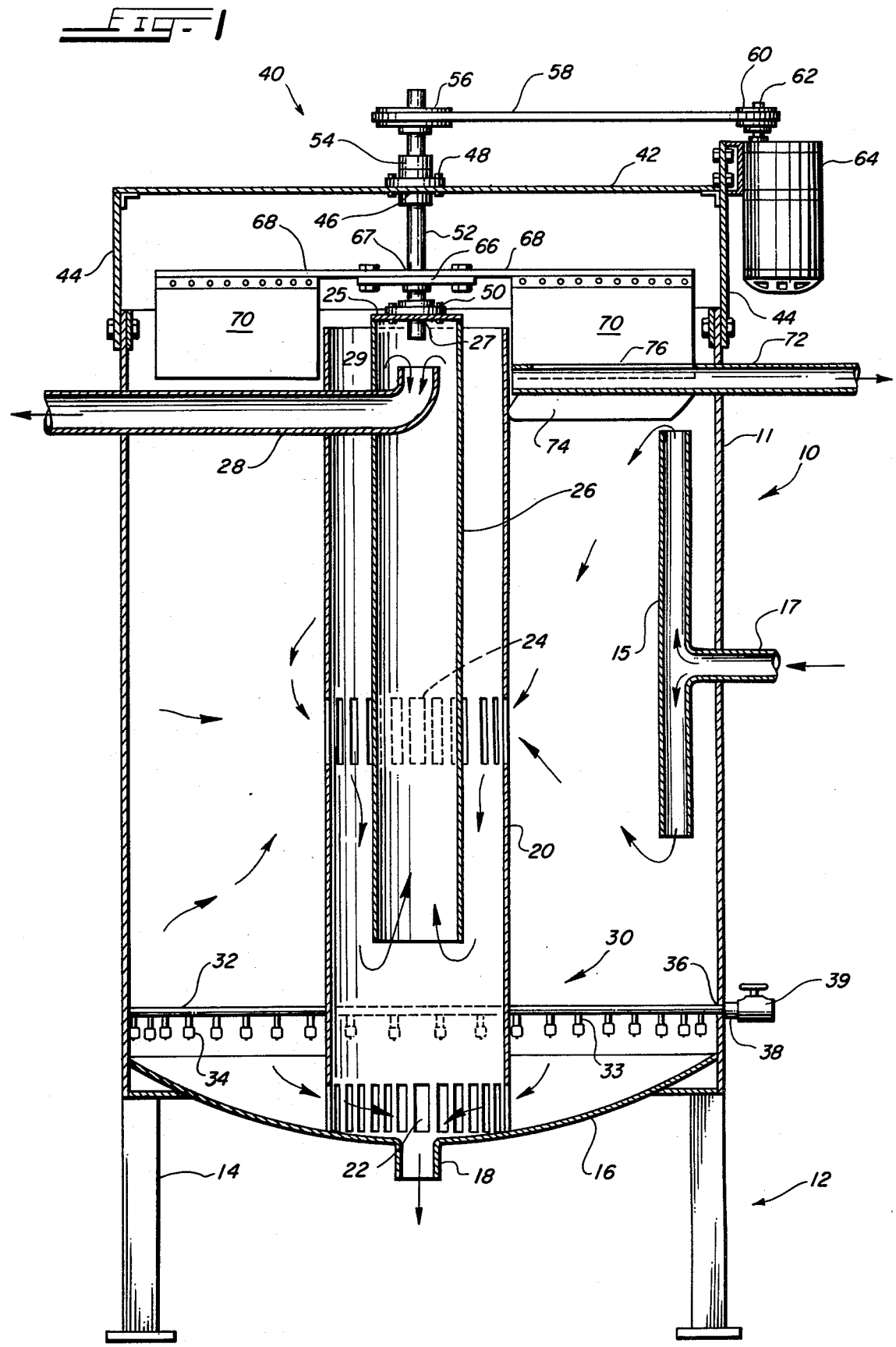

In the form shown, a separator tank 10, comprising a vertically-disposed, cylindrical shell 11 having a large hydraulic diameter, is supported by a stand 12 having a plurality of legs 14 in welded connection with the bottom end of said shell and a concave bottom 16 having a centrally-disposed sludge drain 18.

An inlet tube 15, having open ports 13 at its top and bottom ends, extends in vertical orientation adjacent and along one side of the interior surface of the shell 11 below the level of the liquid therein. A dirty liquid inlet pipe 17 connects with the midsection portion of said inlet tube 15, and extends outwardly through the wall of shell 11 in sealed relation therewith for connection with a source of dirty liquid.

A first separator means comprising a standpipe 20 having an intermediate hydraulic diameter mounts on the bottom 16 within said shell 11 and extends upwardly the length of the same directly over the sludge drain 18. The top end of the standpipe 20, which is open, extends above the level of the liquid in tank 10 and two separate pluralities of vertically-slotted ports 22 and 24 circumferentially dispose around the lower and midsection portions respectively of said standpipe 20 open to the interior of shell 11.

A second separation pipe 26 of small hydraulic diameter centrally locates within said standpipe 20, and has its bottom end openly facing downward, about midway between the slotted ports 22 and 24, and in fluid communication with the interior of the lower portion of said standpipe 20. A plate 25 closes off the top end of the separator pipe 26 above the level of the liquid in tank 10 and a first bearing aperture 27 centrally-locates through the closure plate 25.

An outflow liquid-leveling pipe means comprises an elbowed pipe 29 of smaller hydraulic diameter, which has an inlet opening upwardly, centrally locates within the top portion of the separation pipe 26 below the level of the liquid in the tank 10 and is connected with a discharge pipe 28 which extends outward through and in sealed relation with the walls of the separator pipe 26, said standpipe 20 and said shell 11.

A wash means 30 comprises a copper tube 32 which encircles the interior of the lower portion of said tank 10 adjacent the wall of shell 11. A plurality of stub tubes 33 depend axially from the tube 32 in circumferentially-spaced relation on the lower side of the tube, in fluid communication therewith, and spray tubes 34 which slip over the tubes 33 are directed toward the bottom 16 of tank 10. A tubing adaptor 36 connects to the tube 32 for fluid communication with a pipe nipple 38 which is welded to the exterior of and passes through the wall of shell 11. A shutoff valve 39 mounts on the nipple 38.

A skimmer means 40 rotatably mounts atop the tank 10 on cross-mounting plate 42 which is supported by brackets 44 connected on the top end of the shell 11. A second aperture 46 is centrally located in said plate 42 in concentric vertical relation with respect to the first aperture 27 in closure plate 25 on the separator pipe 26. A first flange-mounted thrust bearing 48 mounts on top of plate 42 in concentric relation with the aperture 46 and a second flange-mounted thrust bearing 50 mounts on top of closure plate 25 in concentric relation with the first flange-mounted thrust bearing 48. A shaft 52 vertically extends through and radially locates in the first and second bearings 48 and 50 and a shaft mounting collar 54 slips on and is set-screwed to shaft 52 above and in contact relation with the top of first thrust bearing 48 for retaining and supporting said shaft on the cross-mounting plate 42. A driven pulley 56 mounts on shaft 52 above the collar 54 and a drive belt 58 connects the driven pulley 56 with a driver pulley 60 mounted on the output shaft 62 of a speed-reducer electric motor 64 which is mounted on the tank 10 by means of a bracket 44.

A skimmer mounting collar 66 having a third aperture 67 slips on and is set-screwed to shaft 52 in spaced relation above the second thrust bearing 50 and skimmer arms 68 center on and bolt to an extension from opposite sides of mounting collar 66. Flexible skimmer paddles 70 having horizontal bottom edges which extend just below the liquid level in the tank 10 mount on and depend from each of the skimmer arms 68 for skimming the floatable waste off the surface of the liquid. A skimmer drain-off pipe 72 radially extends through and is supported by the wall of shell 11 in sealed and welded connection with the same on a level with the discharge pipe 28. A skimmer ramp 74 mounts along one side of pipe 72 and a slot 76 along the top of the drain-off pipe 72 cooperates with the lower portion of the paddles 70 for the removal of floatable waste from the top surface of the liquid in the tank 10.

In the operation of the solid waste separator for continuous cleansing reusable industrial liquids, the liquid containing floatable and settleable waste enters through the inlet pipe 17 to tank 10 splitting the flow in inlet tube 15 in an upwardly and downwardly direction to avoid turbulence in the tank and permitting separation of a considerable portion of the floatable and settleable waste products from the liquid in the large volume of the shell 11. A large portion of the liquid in the shell 11 from which much of the floatable and settleable waste is being separated circulates relatively slowly in the shell 11 as the liquid flows from the inlet tube 15 and finally enters the standpipe 20 through slotted ports 24 which are circumferentially disposed around the midsection portions thereof, and the solids which by then have settled from the liquid to the bottom of the tank are washed through the slotted ports 22 in the lower portions of the standpipe 20. The flow of the partially cleansed liquid is downward inside the lower portion of the standpipe 20 and then turns abruptly to enter the lower open end of the separator pipe 26 and flow upward the length of the same. This results in a final settling of the solids to the concave bottom 16 of the shell 11. The accumulated solid waste from the shell 11, the standpipe 20 and the separator pipe 26 aggregate on concave bottom 16 to flow out the sludge drain 18 when it is opened for cleansing. The wash means 30 which encircles the interior of the lower portion of shell 11 sprays clean liquid on the concave bottom 16 to assist in flushing and removal of the accumulated sludge.

Liquid, having had the last of settleable wastes removed, flows to the top of the separator pipe 26 to enter elbowed pipe 29, which opens upwardly, to flow in a downwardly direction so as to assure maximum separation of the solid wastes from the liquid. The cleansed liquid flows out the discharge pipe 28 ready for reuse.

Although but one specific embodiment of this invention is herein shown and described, it will be understood that details of the construction shown may be altered or omitted without departing from the spirit of the invention as defined by the following claims.

We claim:
1. A solid waste separator apparatus comprising:
   (a) a shell having a large hydraulic diameter vertically oriented relative to gravity and a sealed bottom connected thereto with a sludge drain mounted therein;
   (b) inflow separator tube means of small hydraulic diameter and open at both ends vertically oriented within and adjacent to the wall of the shell below the level of the liquid in the shell and in fluid communication with an external source of dirty liquid;
   (c) first separator pipe means of intermediate hydraulic diameter open at its ends and vertically oriented within the shell with its lower portion adjacent the bottom of the shell and its upper portion extending above the level of the liquid therein, said first pipe means having its lower portion and midsection portion in fluid communication with the interior of the shell;
   (d) second separator pipe means of small hydraulic diameter vertically oriented within the first separator pipe means and extending from adjacent the lower portion of the first separator pipe to a point above the level of the liquid therein, said second pipe means having its lower portion in fluid communication with the first separator pipe means between the lower portion of the mid portion thereof;
   (e) outflow liquid leveling pipe means of small hydraulic diameter vertically oriented within the upper portion of the second separator pipe means below the level of the liquid in said shell and in fluid communication with the upper portion of the second separator pipe means; and
   (f) discharge pipe means in fluid communication with said outflow liquid leveling pipe means.

2. A separator apparatus, as set forth in claim 1, wherein the first separator pipe means comprises a cylindrical standpipe open at the top and mounted on the bottom of the tank in concentric relation with and over the sludge drain having vertically-elongated slotted ports arrayed about the circumference of said pipe at the midsection and at the lower portion thereof.

3. A separator apparatus, as set forth in claim 1, wherein the second separator pipe means comprises a section of cylindrical pipe having a closure at the top with a first bearing aperture centrally located therein mounted on the shell of the tank in concentric relation with and over the sludge drain and having an open bottom end.

4. In a separator apparatus as set forth in claim 3, the improvement comprising a skimmer means mounted on and adjacent the top portion of the wall of said shell.

5. In a separator apparatus as set forth in claim 1, the improvement comprising a wash means mounted on and adjacent the lower portion of the wall of said shell.

6. A separator apparatus as set forth in claim 5, wherein the wash means comprises:
   (a) a circumferentially-split tube circumferentially adjacent to said wall having a closure at one end and the other end fitted with a pipe connector;
   (b) a plurality of spray means depending from said circumferential tube and in fluid communication therewith;
   (c) a pipe nipple mounted on said wall having one end connected to and in fluid communication with the pipe connector on the end of said split-tube; and
   (d) a shutoff valve in fluid communication with the other end of said nipple and with a source of clean liquid.

7. A separator apparatus, as set forth in claim 6, wherein the spray means comprises:
   (a) a plurality of stub tubes spaced circumferentially; and
   (b) spray nipples in fluid communication with said stub tubes.

8. A separator tank, as set forth in claim 6, wherein the skimmer means comprises:
   (a) a cross-mounting plate supported at each end on brackets mounting on the top of the cylindrical shell of said tank having a second bearing aperture centrally located therein;

(b) a first flange-mounted radial-thrust bearing mounted in the first aperture on the closure on the top of the second pipe;
(c) a second flange-mounted radial-thrust bearing mounted in the second aperture on the cross-mounting plate in concentric relation with said first bearing;
(d) a skimmer drive shaft mounted in said first and second bearings;
(e) a shaft mounting collar slipped on and set-screwed to said drive shaft above said second radial-thrust bearing for retaining said shaft in said bearings;
(f) a driven pulley mounted on the extension of the drive shaft above said collar;
(g) a drive belt engaging the driven pulley;
(h) a driver pulley engaging the belt;
(i) a speed-reducer motor mounting on the bracket on the shell of the tank having its output shaft in engagement with the driver pulley;
(j) a skimmer mounting collar slipped on and set-screwed to said drive shaft;
(k) skimmer arms mounted on and extending from the skimmer mounting collar in the radial direction;
(l) flexible skimmer paddles depending from each arm;
(m) a skimmer drain-off pipe mounting on and radially extending over the upper portion of the shell;
(n) a skimmer ramp mounting along one side of the drain-off pipe; and
(o) a slot in the top of said drain-off pipe extending in the radial direction.

* * * * *